United States Patent
Trümper et al.

(10) Patent No.: US 9,695,604 B2
(45) Date of Patent: Jul. 4, 2017

(54) DEVICE AND METHOD FOR CONVEYING THICK MATTER, IN PARTICULAR CONCRETE, WITH ANGLE OF ROTATION MEASUREMENT

(75) Inventors: Siegfried Trümper, Dortmund (DE); Reiner Vierkotten, Oberhausen (DE)

(73) Assignee: SCHWING GMBH, Herne (DE)

( * ) Notice: Subject to any disclaimer, the term of this patent is extended or adjusted under 35 U.S.C. 154(b) by 679 days.

(21) Appl. No.: 14/112,856

(22) PCT Filed: Apr. 4, 2012

(86) PCT No.: PCT/EP2012/001502
§ 371 (c)(1),
(2), (4) Date: May 23, 2014

(87) PCT Pub. No.: WO2012/143092
PCT Pub. Date: Oct. 26, 2012

(65) Prior Publication Data
US 2014/0246101 A1    Sep. 4, 2014

(30) Foreign Application Priority Data

Apr. 20, 2011    (DE) .......................... 10 2011 018 267

(51) Int. Cl.
*E04G 21/04*    (2006.01)
*E02F 9/12*    (2006.01)
(Continued)

(52) U.S. Cl.
CPC .......... *E04G 21/0463* (2013.01); *B66C 23/86* (2013.01); *E02F 9/123* (2013.01);
(Continued)

(58) Field of Classification Search
CPC combination set(s) only.
See application file for complete search history.

(56) References Cited

U.S. PATENT DOCUMENTS 3,945,138 A  *  3/1976  Heusler ..................... E02F 3/26
                                                        173/8
5,220,282 A  *  6/1993  Zimmermann ....... H03M 1/202
                                                        324/207.12
(Continued)

FOREIGN PATENT DOCUMENTS

EP    2241529 B1    10/2010
FR    2538575 A1    6/1984

OTHER PUBLICATIONS

International Search Report and Written Opinion issued in PCT/EP2012/001502, mailed Jul. 24, 2012, 31 pgs.

*Primary Examiner* — Thomas G Black
*Assistant Examiner* — Ana Thomas
(74) *Attorney, Agent, or Firm* — Faegre Baker Daniels LLP

(57) ABSTRACT

A device for conveying thick matter including a thick matter pump; a feed line which leads away from the pump; a boom which receives the feed line and which includes at least one boom arm and which is arranged on a swivel bogie, wherein the swivel bogie is rotatable for angular orientation of the boom through a drive, in particular a hydraulic motor with a transmission arranged thereon, and a measuring device which includes rotation angle sensors for measuring the rotation angle of the swivel bogie, wherein the rotation angle of the swivel bogie is measured through direct measurement of a rotation angle of the drive or of the transmission arranged between the motor and swivel bogie.

19 Claims, 4 Drawing Sheets

(51) Int. Cl.
*B66C 23/86* (2006.01)
*G01B 7/30* (2006.01)

(52) U.S. Cl.
CPC ..... *E04G 21/0436* (2013.01); *E04G 21/0445* (2013.01); *G01B 7/30* (2013.01); *Y10T 137/6947* (2015.04); *Y10T 137/8807* (2015.04)

(56) References Cited

U.S. PATENT DOCUMENTS

| | | | | |
|---|---|---|---|---|
| 6,164,923 | A | * 12/2000 | Mayer | F04B 17/05 417/212 |
| 6,202,013 | B1 | * 3/2001 | Anderson | B66C 13/40 212/276 |
| 8,251,095 | B2 | * 8/2012 | Trumper | E04G 21/04 137/615 |
| 2004/0151544 | A1 | * 8/2004 | Trumper | F15B 15/1447 404/17 |
| 2006/0015227 | A1 | 1/2006 | Knoll | |
| 2007/0069719 | A1 | * 3/2007 | Hatanaka | G01D 5/145 324/207.25 |
| 2009/0028633 | A1 | * 1/2009 | Trumper | E04G 21/04 403/78 |
| 2012/0049499 | A1 | * 3/2012 | Hartweg | B66C 23/80 280/763.1 |
| 2016/0223313 | A1 | * 8/2016 | Vierkotten | B66C 13/46 |

\* cited by examiner

DEVICE AND METHOD FOR CONVEYING THICK MATTER, IN PARTICULAR CONCRETE, WITH ANGLE OF ROTATION MEASUREMENT

CROSS-REFERENCE TO RELATED APPLICATION

This application is a national phase application of PCT application No. PCT/EP2012/001502, internationally filed Apr. 4, 2012, which claims priority to German Application No. 10 2011 018 267.5, filed Apr. 20, 2011, both of which are herein incorporated by reference in their entirety.

TECHNICAL FIELD

The invention relates to a device according to a device for conveying thick matter, in particular concrete and to a method for determining a rotation angle of a boom of a device for feeding thick matter, in particular concrete.

BACKGROUND

The invention relates to concrete pumps, in particular truck mounted concrete pumps, however, it is not limited to conveying concrete but is applicable to conveying thick matters in general, thus sludges of any type.

For above-ground construction and also for underground construction, concrete pumps of various types and various power ratings are being used in order to put out concrete that is delivered on site by mixing vehicles in order to form walls, ceilings and similar. Thus stationary concrete pumps and also mobile concrete pumps, in particular so-called truck mounted concrete pumps are being used. In the case of truck mounted concrete pumps, the pump is arranged on a frame or a bed of a truck and sucks concrete from a filling funnel that is arranged at the vehicle, wherein the concrete is put out in a controlled manner at the construction site through an outgoing feed conduit. Truck mounted concrete pumps of this type typically include a boom which is configured from plural boom arms linked with one another which can be pivoted in, in a space saving manner for driving operations, so that the boom arms of the boom are arranged more or less parallel but are folded together in a tight space on the frame or the bed so that road transportation is easily provided. These booms are supported through a pivot link on a swivel bogie which is supported rotatable about its vertical axis at the vehicle frame, in particular at a boom block that is fixated at the vehicle. Through the swivel bogie with the swivel boom linked thereto in a pivotable manner, the boom is extensible through folding out the boom arms and can be rotated or swiveled by 360° about the rotation axis of the swivel bogie. Thus a very large area can be supplied with concrete once the vehicle is positioned.

Since for a more or less extended boom which can be furthermore swiveled at will about the swivel bogie axis and thus is also adjustable into a position that laterally extends from the vehicle, respective pivot torques can be imparted upon the concrete vehicle. These vehicles are provided with laterally extensible supports in order to provide a safe support of the vehicle that is secured against tipping. However, these supports are quite critical and depending on the length of the boom a support is required that is adapted accordingly. Thus, as a function of the extended position of the boom relative to the vehicle and the center of gravity of the truck mounted concrete pump a respective deployment position of the support elements is required. This is difficult on site since conditions are often provided at construction sites which severely restrict the positions of the support elements so that depending on the construction site or the position of the vehicle, the support elements can be fully deployed on one side and cannot be deployed or can only be partially deployed on the other side. In case that the tilt moments that are caused by the deployed boom cannot be received by the support bases, the vehicle can flip. It is apparent that it can't be left up to the driver of the concrete delivery vehicle on site to determine from which swivel or deployment position of the boom a flipping of the vehicle can occur in order to deploy the support bases accordingly. Therefore, the pumps, in particular the truck mounted concrete pumps are configured with systems which also capture and process the precise position of the swivel ring in addition to the deployment of the boom in order to be able to take appropriate safety precautions at any time.

In a known embodiment, an end switch is used for rotation angle determination which end switch is mounted at an outer circumference of the swivel ring of the swivel bogie. It is disadvantageous for this embodiment that only an end position of the system is detected. Furthermore this system provides no redundancy against failure. In particular, however, this system is not suitable for measuring a plurality of intermediary positions of the swivel ring since this would require a substantial number of end switches. This, however, would cause very high complexity for wiring the components and would cause overall assembly complexity.

In another known system the position of the swivel ring is captured by two rotation angle sensors arranged at an outer circumference, wherein the rotation angle sensors are respectively provided with an individual drive and a transmission connected there between. Though this can reliably measure any position of the swivel ring and thus also provide the required redundancy for the system, however, it requires high manufacturing complexity. Additionally these rotation angle sensors are rather bulky and have relatively high weight which is disadvantageous for a light weight construction of the entire machine. Thus, overall this system is rather expensive.

SUMMARY

Thus it is an object of the invention to provide a method and a device which facilitates in a simple and reliable manner to precisely determine an angular position of the swivel bogie with a boom arranged thereon. Additionally redundancy shall be provided and the configuration has to be provided in a space and weight saving manner.

This object is achieved according to the invention through a device with a rotation angle of a swivel bogie measured through direct measurement of a rotation angle of a drive or of a transmission arranged between a motor and swivel bogie. The object is also achieved through a method with a rotation angle determination performed by counting incremental impulse signals of at least two sensors which measure the number of revolutions of a drive or of a transmission through a cam disc arranged at a shaft of the drive or of the transmission, wherein the impulses are counted up or counted down as a function of the direction of rotation determined by the sensors, and wherein a current rotation angle of a swivel bogie is determined based on the counted value through a processing device based on a predetermined drive geometry. Advantageous embodiments of the invention and of the method are characterized by the features in the dependent claims.

According to at least some embodiments of the invention, the revolutions of the output shaft of the drive or of a shaft of a transmission connected thereto are captured for driving the swivel bogie is captured and not the swivel ring. Thus, simple sensors can be used, advantageously two or four sensors without this being limiting, wherein the triggered impulse signals can be counted in a simple manner. When using two sensors this facilitates determining the rotation direction, thus the direction of revolution of the drive shaft and thus also the rotation angle and the rotation angle itself. Depending on the direction of rotation, an upward counting or downward counting is performed. Through these counting impulses, the exact position of the swivel ring including the respective rotation direction can be determined through a processing unit in consideration of the particular drive geometry, in particular the geometry of the step down transmission and the drive sprocket of the transmission interacting with a swivel ring at the swivel bogie.

The angle measuring system according to at least some embodiments of the invention thus uses the drive that is provided anyhow, which is typically formed by a hydraulic drive or hydraulic motor including the transmission provided at this location whose drive sprocket engages the swivel ring of the swivel bogie. Advantageously impulse generation is provided through a cam disc which is arranged rotationally fixated on the drive shaft or transmission shaft, in particular the transmission output shaft and whose sensing cam is then captured by sensors placed around the cam disc. Thus, simple impulse counting can be provided which counts up or down depending on the direction of rotation. Thus sensors, in particular digital sensors can be used that are available in the market at economical cost. The additional complexity which is generated by this system is therefore only caused by the cam disc that has to be flanged on additionally and by the sensor which can be used in a small configuration.

Advantageously a cam disc with two sensing cams is used in an embodiment with two sensors, wherein in an advantageous embodiment the sensing cams are formed by radial flanks or shoulders of the cam disc. Through the flanks the sensors are triggered and respective impulse signals are generated which are provided to a suitable processing unit. Thus, it is possible with two sensors to capture the respective rotation direction thus forward or backward and also to capture the respective rotation angle values. The rotation angle is determined through simple multiplication with the resolution or parameters caused by the transmission geometry. Impulse multiplication overall provides a very fine resolution which facilitates exact and sensitive rotation angle determination.

In an advantageous embodiment, four sensors are being used which are arranged preferably with an angular offset of 90° about the cam disc. A measuring system of this type has the advantage that when a sensor fails the rotation direction and also the rotation angle value is detected through impulses and thus also continuous rotation angle determination is provided when one sensor fails. Thus mutual monitoring of a plausibility of plural sensors is provided.

The method according to at least some embodiments of the invention is characterized by counting the triggered impulses implied by the flanks of the cam disc, wherein the counting is performed in the case of plural sensors depending on the direction of rotation in upward direction or downward direction so that the exact rotation angle position can be defined for any amount of swivel of the rotation bogie. The invention is suitable in particular for truck mounted concrete pumps with booms with plural boom arms but it is also suitable for stationary concrete pumps with swivel bogie and boom arm.

Rotation angle determination can be provided in a simple manner using a processing unit which includes a computer for counting the impulses and a multiplier which can convert the count into the respective rotation angle value in view of the particular geometry of the rotation angle drive which is caused by the step down transmission and the ratio between drive sprocket and swivel ring with the ensuing resolution. The idle position of the boom in the boom holder is advantageously used as a respective reference point, in which position the boom is typically arranged in the longitudinal direction of the vehicle and stored in a boom support. The measuring system can be integrated into existing vehicles in a simple manner and provides uniform count which is helpful for exact position determination. The invention is thus characterized by a simple and robust configuration. Since conventional sensors can be easily used as sensors, the cost increase through this additional measure is very small. This is favored in that the capture is directly performed through the existing drive and transmission.

BRIEF DESCRIPTION OF THE DRAWINGS

Subsequently, embodiments of the invention are described with reference to drawing figures, wherein.

DETAILED DESCRIPTION

Figure 1:
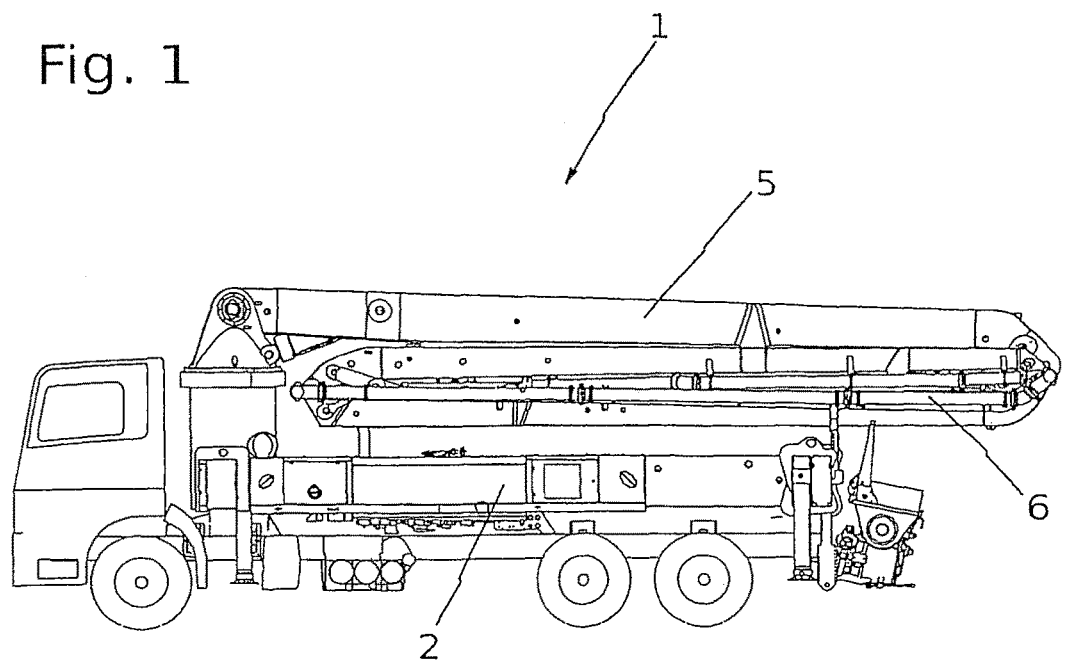
FIG. 1 illustrates a side view of a truck mounted concrete pump in a preferred embodiment.

FIG. 1 illustrates a so-called truck mounted concrete pump of which only components are drawn which are relevant for understanding the invention. Truck mounted concrete pumps of this type are generally known in the art and characterized in that they are mounted on a truck.

In the drawing the truck mounted concrete pump is generally designated as 1, wherein the concrete pump mounted on the vehicle frame is designated as 2 and includes a swivel bogie 3 that is also arranged on the frame wherein the swivel bogie is rotatable about its central axis 4 in various angular positions and the truck mounted concrete pump also includes a boom 5 including plural boom arms. The concrete feed line 6 is mounted on the boom 5.

Figure 2:
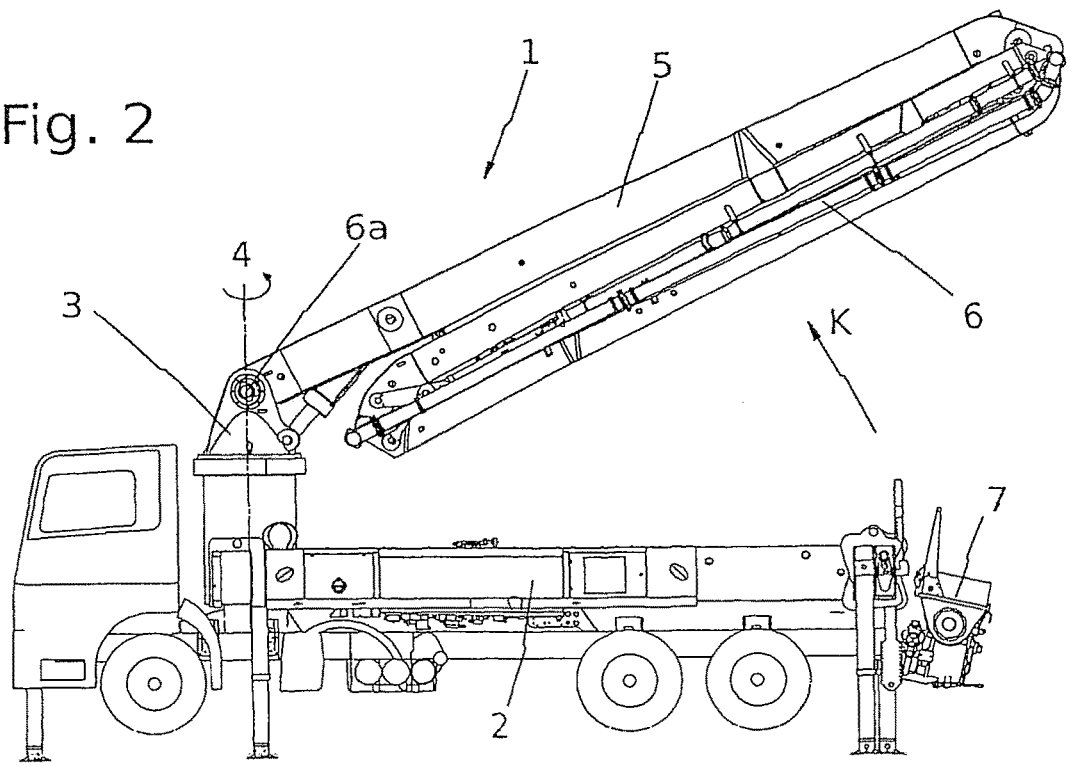
FIG. 2 illustrates a side view of the vehicle illustrated in FIG. 1 with a tilted boom.

As apparent from FIG. 2, the boom 5 is supported on the swivel bogie at 6a through a pivot link so that the boom 5 is transferrable from its idle position in FIG. 1 into the pivoted position that is apparent from FIG. 2, wherein the pivot movement is designated with the arrow K.

Figure 3:
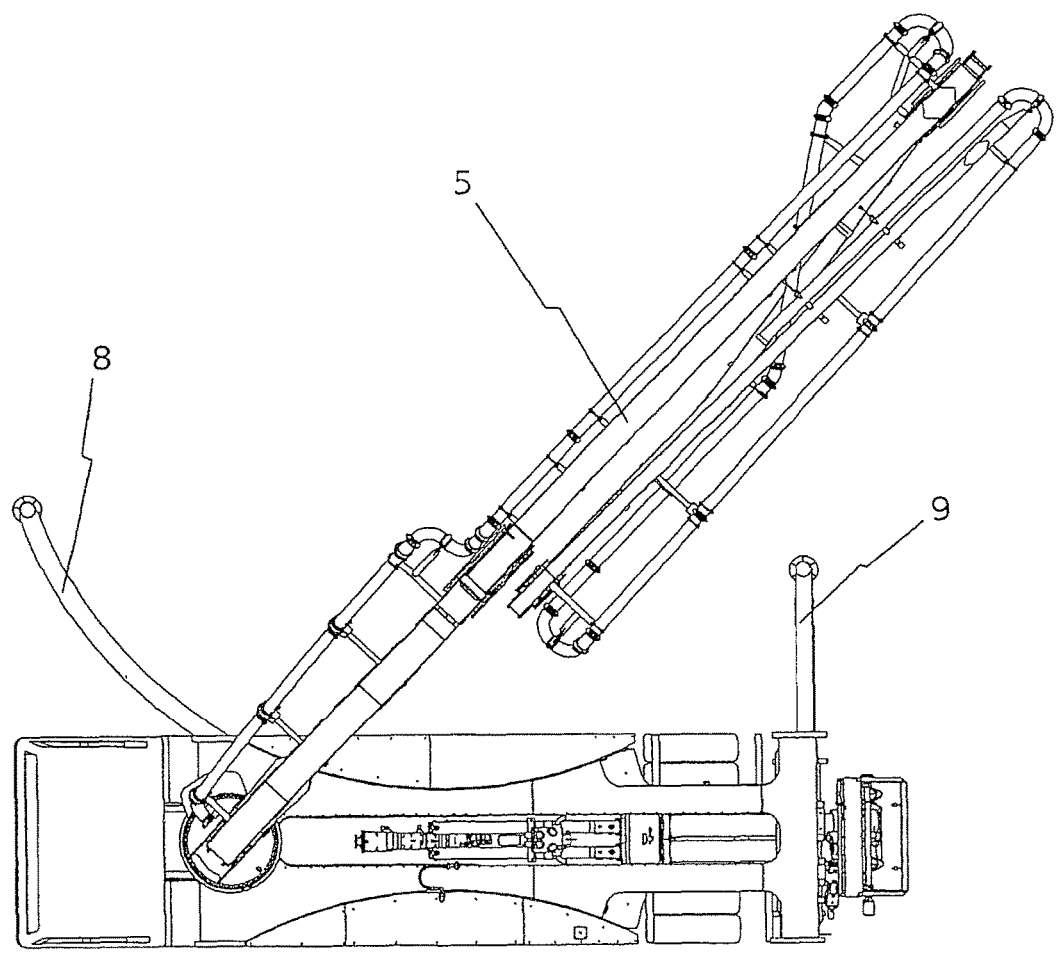
FIG. 3 illustrates a top view of the vehicle of FIG. 2.

For concrete pump operations of the truck mounted concrete pump illustrated in FIGS. 1 through 3, concrete is typically poured through a mobile mixer into a filling funnel 7 arranged at the rear end of the vehicle frame, wherein the concrete is sucked in by the pump 2 and moved into the feed conduit 6 in a timed manner.

For putting out the concrete, the boom 5 is deployed, thus by unfolding the boom arms that are supported at one another in a pivotable manner so that the concrete is put out at the end of the conduit through an outlet trunk which is not illustrated but well known in the art. As a consequence of the pivot movement and the fold out movement of the boom 5 and the rotation of the boom through the swivel bogie about the bogie axis 4, concrete can be put out by the vehicle at any location over a very wide range. Truck mounted concrete pumps of this type are particularly suitable for producing concrete ceilings in multilevel houses in order to illustrate only one of the plural applications. For operations, a secure stand of the vehicle is required in case the boom 5 deploys. For this purpose in general front and rear supports 8 and 9 are provided which are in particular apparent in deployed position from FIG. 3. FIG. 3 illustrates the supports 8 and 9 only on one side of the vehicle, however, respective supports are also provided on the opposite side of the vehicle and can be extended as required.

Depending on how far the arms of the boom 5 are extended, substantial pivot torques are imparted to the vehicle so that it is essential to not only determine the arm extension of the boom 5 but also the exact position of the swivel ring which supports the boom 5.

Figure 8:
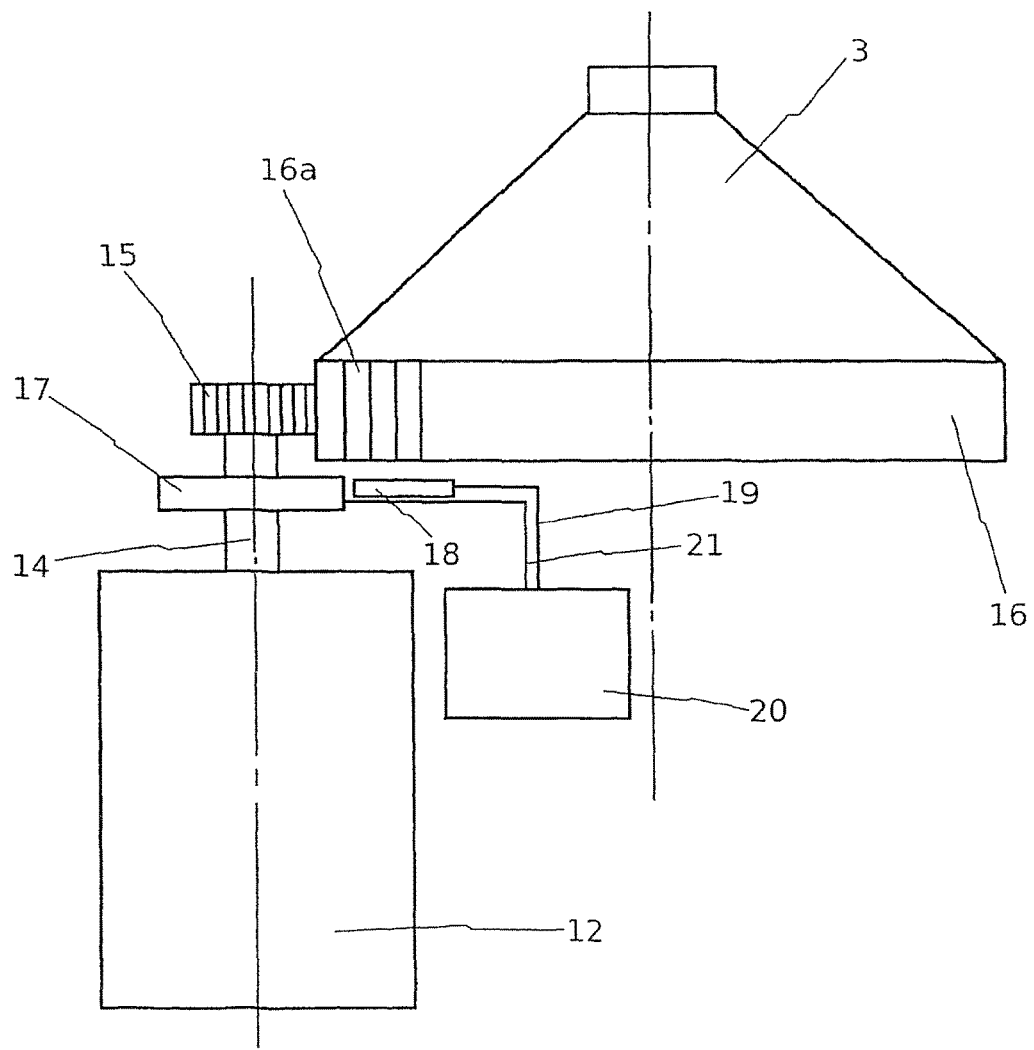
FIG. 8 illustrates a schematic block diagram of a measuring device.

The rotation of the swivel bogie 3 and thus of the boom 5 supported thereon is performed through a drive and a transmission which is well known in the art and which is schematically illustrated in the block diagram of FIG. 8.

In FIG. 8 the drive for the swivel bogie 3 is designated as 12, wherein this is typically a hydraulic motor. The output shaft of the motor 12 is designated with 14. The output shaft of the motor 12 leads into a transmission of which only the sprocket 15 arranged on the transmission output shaft is illustrated in FIG. 8 for reasons of clarity, wherein the teeth of the sprocket are only indicated. The sprocket 15 interacts with a swivel ring 16 arranged at the swivel bogie 3 which swivel ring is only schematically illustrated and configured circumferentially extending about the bogie 3 and provided with a respective teething 16a which is only partially illustrated in FIG. 8 for simplicity reasons. By any means the sprocket 15 interacts with the teething of the swivel ring 16 of the swivel bogie 3 to drive the swivel bogie 3 in rotation.

Figure 4:
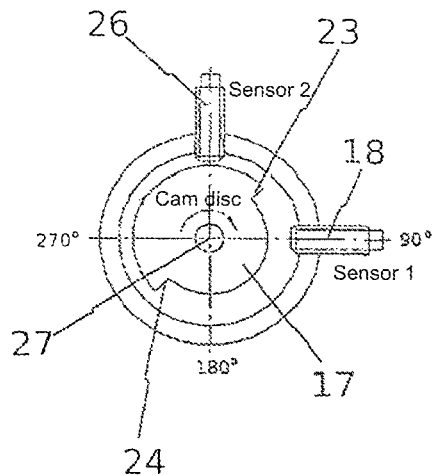
FIG. 4 illustrates a schematic top view of the measuring disc of the measuring device according to the invention.
Figure 6:
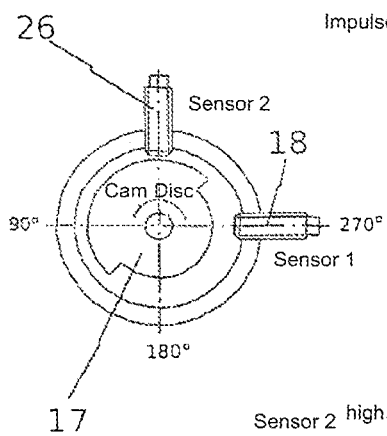
FIG. 6 illustrates an analog top view of a cam disc according to FIG. 4.

As clearly apparent from FIG. 8, a cam disc is arranged on the motor shaft 14 that is apparent in top view from FIGS. 4 and 6, wherein the cam disc rotates with the shaft 14. The cam disc can also be arranged on one of the transmission shafts. Sensors or proximity switches 18 are grouped around the cam disc 17 wherein only two of the sensors 18 provided in this embodiment are provided in FIG. 8. The sensors scan the circumferential cam disc which is provided with the respective scanning cams. As soon as a scanning cam passes a sensor, an impulse is created in the sensor 18 which provides a respective impulse signal through the conductor 19 to a processing unit 20 illustrated as a block diagram. With respect to the second sensor 18, that is not apparent from FIG. 8, a second signal conductor 21 is illustrated.

From FIGS. 4 and 6, an embodiment of a cam disc is apparent. Thus the scanning cams are formed at this cam disc through radially extending shoulders 23 and 24 which are offset from one another by an angle of 180°. In this embodiment, two scanning cams in the form of radial shoulders 23 and 24 are illustrated which interact with two sensors 18 and 26. As illustrated in FIGS. 4 and 6, the sensors 18 and 26 are arranged offset from one another by 90° and radially oriented towards the center 27 of the cam disc. The center of the cam disc coincides with the shaft axis. It is evident that the cam disc is driven with the same speed as the drive shaft 14 and thus with the same speed. It is also evident that the radial shoulders 23 and 24 are oriented differently, wherein the radial shoulder 23 represents a leading shoulder and the radial shoulder 24 represents a trailing shoulder in the clockwise rotation direction illustrated by the rotation arrow in FIG. 4. Accordingly different shifting signals are provided, wherein the radial shoulder 23 provides a shifting signal designated with "high" and the radial shoulder 24 provides a shifting signal designated with "low" in the diagram in FIG. 5.

Thus typical sensors are used for sensors, in particular digital sensors. The sensors can be configured as inductive or capacitive sensors.

Figure 5:
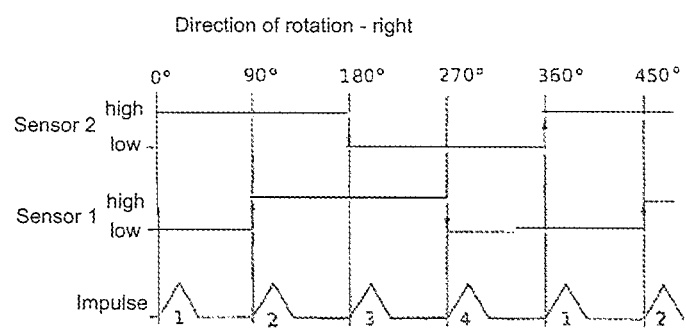
FIG. 5 illustrates a diagram of switching conditions of the measuring device according to FIG. 4 for a clockwise rotation.

When rotating the cam disc clockwise a switching impulse "high" is given, as soon as the radial shoulder or scanning cam passes the sensor 26 which represents the track 2 in the switching diagram according to FIG. 5. This yields a respective switching condition which is illustrated with an upward arrow at the zero degree angular position. As soon as the radial shoulder is moved forward by 90°, the shoulder 23 moves in front of the sensor 18 configured as track 1 so that a switching impulse "high" is provided for the track 1 in the switching diagram according to FIG. 5 after a rotation by 90° as apparent from the arrow direction in the diagram according to FIG. 5 and from track 1. For a rotation by 180° the trailing shoulder 24 reaches the sensor 26 so that a switching impulse is generated again in the track 2, thus a switching impulse "low" which is illustrated at an angle of 180° in FIG. 5 with downward arrow. This yields a condition diagram for the switching according to FIG. 5 for a rotation of the cam disc in the clockwise direction illustrated in FIG. 4.

Figure 7:
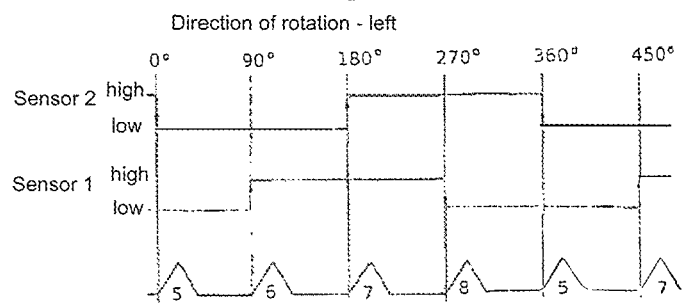
FIG. 7 illustrates a diagram with switching conditions of the measuring device according to FIG. 6 for a counter-clockwise rotation.

When the direction of rotation changes as evident from FIG. 6 this yields a switching diagram for the same configuration of the measuring device as apparent from FIG. 7. The rotation direction according to FIG. 4 and also the rotation direction according to FIG. 6 thus yields four distinctive impulse shapes, wherein the impulse shapes differ as a function of the direction of rotation as apparent from a comparison of the condition images according to FIGS. 5 and 7.

In the condition images, it is apparent for FIG. 5 that the incremental counting of the impulses increases per impulse by one count with the impulses 1, 2, 3, and 4 and that for a reversed rotation according to FIG. 6, the count is respectively reduced by one for the impulses 5, 6, 7 and 8. As indicated in FIG. 8, this incremental impulse count is put into a processing unit 20 where the counting is provided, thus depending on direction of rotation in upward direction or in downward direction according to the impulses.

In the processing unit, depending on the geometry of the swivel bogie drive, the current angle value is computed, thus through multiplying the count value with the resolution which is a function of the transmission data, thus the gearing ratio of the transmission, thus the number of teeth of the sprocket 15 engaging the swivel ring according to FIG. 8 and the number of teeth of the swivel ring which yields the gearing ratio of the rotation assembly. From this the total gearing ratio can be computed and thus the mechanical resolution per revolution of the transmission drive. In a practical embodiment which is recited herein only in an exemplary manner, a resolution of 0.433° per revolution of the transmission drive is achieved based on the transmission geometry. Based on the impulse quadrupling, each measuring that is illustrated based on FIGS. 4 through 7 yields a resolution of 0.109° per impulse.

It is apparent that in the idle position of the boom in which the boom extends according to the illustration in FIG. 1 in alignment with the longitudinal axis of the vehicle, a reference point is generated which is used for preadjusting the angular value. When the vehicle moves with the boom in idle position to the construction site where the concrete has to be put out then the count starts with zero, starting at the reference point as soon as the swivel bogie rotates in clockwise or counterclockwise direction, thus when it is swiveled accordingly. Thus, complex adjustment of end switches at the switching positions can be omitted.

In an embodiment that is not illustrated herein, four sensors that are offset by 90° relative to one another about the cam disc are advantageously used instead of two sensors. This embodiment has the advantage of increased safety. Thus, when one of the sensors fails this yields a lower resolution level, however, the direction of rotation and also the rotation angle are detected and counted. This means the impulse counting continues, though with lower resolution with respect to the angular value. It is also visible that a sensor has failed which can then be replaced easily. Thus the level of safety can be increased accordingly without great complexity.

Certainly also more than four sensors can be used wherein respective cam disc configurations provide that the cam disc is configured without dynamic imbalance.

Thus, the described measuring arrangement yields unambiguous impulse counting wherein simple multiplication according to the respective transmission geometry yields an exact rotation angle value for each position of the swivel bogie at any point in time. For these measuring devices, sensors in typical construction can be used which are very economical so that the cost for the measuring device is rather low. Furthermore, redundancy is provided at any time. It is advantageous that the impulse sequence is defined unambiguously through the described measuring device, this means for a rotation to the left the impulses always occur in the sequence 1, 2, 3, 4 and then 1 again, etc. In the reverse direction of rotation, the sequence is always 5, 6, 7 and 8 and then 5 again. Thus, also for a reversal of the rotation direction, the sequence is unambiguous. This means for a reversal after impulse 1, impulse 2 has to follow and after 2 there comes 3, etc.

This is evident from table 1 depicted infra which provides the switching conditions according to the measuring device of FIGS. 4 through 7.

TABLE 1

| | Track 1 | | Track 2 | | Direction |
|---|---|---|---|---|---|
| | Flank | Level | Flank | Level | of |
| Impulse Nr.: | + − | High Low | + − | High Low | Rotation |
| 1 | X | | | X | left |
| 2 | X | | X | | |
| 3 | X | | | X | |
| 4 | | X | X | | |
| 5 | X | | X | | right |
| 6 | X | | | X | |
| 7 | | X | X | | |
| 8 | X | | | X | |

When data that is important for the detection is permanently stored in the system it can also be detected beyond the switched off condition whether the system operates correctly.

When one sensor fails in the embodiment of a measuring device with two sensors based on the embodiments illustrated in FIGS. 4 and 6, then the counter does not change its value anymore (+1, −1, . . . ). When the movement direction is known (for example in case of an electrical control) it can be detected which sensor has failed with which error graph, however, the counted value then becomes imprecise, namely the resolution is about cut in half.

When using four sensors at the cam disc compared to two sensors according to FIGS. 4 and 6, two autonomous counters are configured which can monitor each other for plausibility. The impulses gained from this with four sensors in an arrangement where the sensors are respectively offset from one another by an angle of 90° are listed in table 2 depicted infra.

TABLE 2

| Error Table | | | | | | | | | |
|---|---|---|---|---|---|---|---|---|---|
| Defective Track | | | Change at: | | Additional Impulse at: | | Direction of Rotation: | | Count Invalid: |
| Encoder | Track | Condition | Encoder | Impulse Old | Impulse New | Encoder | Impulse New | Encoder 1: | Encoder 2: | Encoder: |
| 1 | 1 | high | 1 | 5 | 2 | 2 | 3 | right −> left | left | 1 |
| 1 | 1 | high | 1 | 2 | 5 | 2 | 1 | left −> right | left | 1 |
| 1 | 1 | high | 1 | 5 | 2 | 2 | 8 | right −> left | right | 1 |
| 1 | 1 | high | 1 | 2 | 5 | 2 | 6 | left −> right | right | 1 |
| 1 | 1 | low | 1 | 7 | 4 | 2 | 1 | right −> left | left | 1 |
| 1 | 1 | low | 1 | 4 | 7 | 2 | 3 | left −> right | left | 1 |
| 1 | 1 | low | 1 | 7 | 4 | 2 | 8 | right −> left | right | 1 |
| 1 | 1 | low | 1 | 4 | 7 | 2 | 6 | left −> right | right | 1 |
| 1 | 2 | high | 1 | 8 | 1 | 2 | 2 | right −> left | left | 1 |
| 1 | 2 | high | 1 | 1 | 6 | 2 | 4 | left −> right | left | 1 |
| 1 | 2 | high | 1 | 6 | 1 | 2 | 5 | right −> left | right | 1 |
| 1 | 2 | high | 1 | 1 | 6 | 2 | 7 | left −> right | right | 1 |
| 1 | 2 | low | 1 | 8 | 3 | 2 | 4 | right −> left | left | 1 |
| 1 | 2 | low | 1 | 3 | 8 | 2 | 2 | left −> right | left | 1 |
| 1 | 2 | low | 1 | 8 | 3 | 2 | 7 | right −> left | right | 1 |
| 1 | 2 | low | 1 | 3 | 8 | 2 | 5 | left −> right | right | 1 |

TABLE 2-continued

Error Table

| Defective Track | | | Change at: | | Additional Impulse at: | | Direction of Rotation: | | Count Invalid: |
|---|---|---|---|---|---|---|---|---|---|
| Encoder | Track | Condition | Impulse Encoder | Impulse Old | Impulse New | Impulse Encoder | Impulse New | Encoder 1: | Encoder 2: | Encoder: |
| 2 | 1 | high | 1 | 5 | 2 | 1 | 3 | left | right -> left | 2 |
| 2 | 1 | high | 1 | 2 | 5 | 1 | 1 | left | left -> right | 2 |
| 2 | 1 | high | 1 | 5 | 2 | 1 | 8 | right | right -> left | 2 |
| 2 | 1 | high | 1 | 2 | 5 | 1 | 6 | right | left -> right | 2 |
| 2 | 1 | low | 1 | 7 | 4 | 1 | 1 | left | right -> left | 2 |
| 2 | 1 | low | 1 | 4 | 7 | 1 | 3 | left | left -> right | 2 |
| 2 | 1 | low | 1 | 7 | 4 | 1 | 8 | right | right -> left | 2 |
| 2 | 1 | low | 1 | 4 | 7 | 1 | 8 | right | left -> right | 2 |
| 2 | 2 | high | 1 | 6 | 1 | 1 | 2 | left | right -> left | 2 |
| 2 | 2 | high | 1 | 1 | 6 | 1 | 4 | left | left -> right | 2 |
| 2 | 2 | high | 1 | 6 | 1 | 1 | 5 | right | right -> left | 2 |
| 2 | 2 | high | 1 | 1 | 8 | 1 | 7 | right | left -> right | 2 |
| 2 | 2 | low | 1 | 8 | 3 | 1 | 4 | left | right -> left | 2 |
| 2 | 2 | low | 1 | 3 | 8 | 1 | 2 | left | left -> right | 2 |
| 2 | 2 | low | 1 | 8 | 3 | 1 | 7 | right | right -> left | 2 |
| 2 | 2 | low | 1 | 3 | 8 | 1 | 5 | right | left -> right | 2 |

The invention is certainly not limited to truck mounted concrete pumps but is also applicable to stationary concrete pumps which are configured with a swivel bogie for supporting a boom.

The invention claimed is:

1. A device for conveying thick matter comprising:
 a thick matter pump;
 a feed line which leads away from the pump;
 a boom which receives the feed line and which includes at least one boom arm and which is arranged on a swivel bogie, wherein the swivel bogie is rotatable for angular orientation of the boom through a drive and a transmission coupled to the swivel bogie, wherein at least one of the drive and the transmission include a shaft coupled to a cam disc, the cam disc having at least one scanning cam; and
 a measuring device which includes rotation angle sensors for measuring the rotation angle of the swivel bogie, wherein the rotation angle of the swivel bogie is measured through direct measurement of a rotation angle of the shaft of the drive or of the transmission through sensing rotation of the cam disc.

2. The device according to claim 1, wherein the cam disc includes at least two scanning cams.

3. The device according to claim 2, wherein the at least two scanning cams are provided on the cam disc with uniform angular offset from one another, and wherein at least two sensors are arranged about the cam disc with uniform angular offset adapted to the angular offset of the at least two scanning cams.

4. The device according to claim 2, wherein the at least two scanning cams are formed by radial shoulders of the cam disc which shoulders form flanks for triggering the sensors.

5. The device according to claim 3, wherein the cam disc includes only two scanning cams which are offset by 180° relative to one another, and wherein the measuring device includes two sensors which are arranged at an angle of 90° relative to one another.

6. The device according to claim 3, wherein the cam disc includes two scanning cams which are offset by 180° relative to one another, and wherein the cam disc includes four scanning cams which are offset from one another by 90° and wherein four sensors are provided for scanning the cam disc which sensors are arranged about the cam disc with a 45° offset.

7. The device according to claim 1, further comprising at least two sensors configured to measure the direction and the rotation angle of the cam disc.

8. The device according to claim 7, wherein the at least two sensors are inductive or capacitive sensors.

9. The device according to claim 7, wherein the device includes a processing unit that is provided with a computer and which counts incremental impulse signals of the at least two sensors up and down based on the respective direction of rotation and determines the angular position of a swivel ring provided on the swivel bogie and thus of the swivel bogie based on the provided geometry of the drive of the swivel bogie.

10. The device according to claim 8, wherein the at least two sensors are digitally operating sensors.

11. The device according to claim 1, wherein the device is formed by a truck mounted concrete pump.

12. The device according to claim 1, wherein the thick matter pump comprises a concrete pump.

13. The device according to claim 1, wherein the swivel bogie is rotatable through a transmission sprocket acting on a swivel ring of the swivel bogie.

14. A method for determining a rotation angle of a boom of a device for feeding thick matter, wherein the boom is arranged on a swivel bogie which is rotatable about its swivel bogie axis through a drive with a transmission connected thereto, the method comprising:
 determining the rotation angle by counting incremental impulse signals of at least two sensors which measure the number of revolutions of the drive or of the transmission through a cam disc arranged at a shaft of the drive or of the transmission;
 counting the impulses up or down as a function of the direction of rotation determined by the at least two sensors; and
 determining a current rotation angle of the swivel bogie based on the counted impulses.

15. The method according to claim 14, wherein the counting is performed digitally.

16. The method according to claim 14, wherein the impulse signals of the at least two sensors are generated by scanning cams of a cam disc which reflects the speed of the drive or of the transmission.

17. The method according to claim 14, wherein at least two sensors are used for the incremental count, and wherein the at least two sensors are offset from one another with even angular offset about an axis of the shaft.

18. The method according to claim 14, wherein at least four sensors are used for the incremental count, and wherein the at least four sensors are offset from one another with even angular offset about the shaft axis.

19. The method according to claim 14, wherein the thick matter comprises concrete.

* * * * *